United States Patent
Baumgaertner et al.

(10) Patent No.: US 12,037,077 B2
(45) Date of Patent: Jul. 16, 2024

(54) METHOD AND DEVICE FOR CONTROLLING A DRIVE UNIT OF A PEDAL-OPERATED VEHICLE

(71) Applicant: Robert Bosch GmbH, Stuttgart (DE)

(72) Inventors: Daniel Baumgaertner, Tuebingen (DE); Tim Dackermann, Tuebingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 472 days.

(21) Appl. No.: 17/426,820

(22) PCT Filed: Mar. 25, 2020

(86) PCT No.: PCT/EP2020/058285
§ 371 (c)(1),
(2) Date: Jul. 29, 2021

(87) PCT Pub. No.: WO2020/216557
PCT Pub. Date: Oct. 29, 2020

(65) Prior Publication Data
US 2022/0119074 A1    Apr. 21, 2022

(30) Foreign Application Priority Data

Apr. 24, 2019 (DE) .................. 10 2019 205 858.2

(51) Int. Cl.
| | |
|---|---|
| *B62M 6/50* | (2010.01) |
| *B62M 6/45* | (2010.01) |
| *B62J 45/411* | (2020.01) |
| *B62J 45/412* | (2020.01) |
| *B62J 45/413* | (2020.01) |

(Continued)

(52) U.S. Cl.
CPC .............. *B62M 6/45* (2013.01); *B62J 45/411* (2020.02); *B62J 45/412* (2020.02); *B62J 45/413* (2020.02); *B62J 45/414* (2020.02); *B62J 45/415* (2020.02); *B62M 6/50* (2013.01)

(58) Field of Classification Search
CPC . B62M 6/45; B62M 6/50; B62J 45/411; B62J 45/412; B62J 45/413; B62J 45/414; B62J 45/415
See application file for complete search history.

(56) References Cited

U.S. PATENT DOCUMENTS

| | | | |
|---|---|---|---|
| 9,522,713 B2 * | 12/2016 | Stegmaier | ................ B62M 6/45 |
| 9,550,489 B2 * | 1/2017 | Voigtlaender | ......... B60W 10/08 |
| 10,589,820 B2 * | 3/2020 | Baumgaertner | ......... B62M 6/50 |

(Continued)

FOREIGN PATENT DOCUMENTS

DE     102016209570 B3     8/2017

OTHER PUBLICATIONS

International Search Report for PCT/EP2020/058285 Issued Jun. 9, 2020.

*Primary Examiner* — Richard M Camby
(74) *Attorney, Agent, or Firm* — NORTON ROSE FULBRIGHT US LLP; Gerard A. Messina

(57) ABSTRACT

A method and a device, including a pedal-operated vehicle. The method includes detecting a particular riding situation and consequently operating the auxiliary drive unit situated on the vehicle, longer than in a normal riding situation, without the driver correspondingly detecting the angular motion of the pedals.

11 Claims, 5 Drawing Sheets

(51) Int. Cl.
*B62J 45/414* (2020.01)
*B62J 45/415* (2020.01)

(56) References Cited

U.S. PATENT DOCUMENTS

| | | | |
|---|---|---|---|
| 2013/0179016 A1* | 7/2013 | Gale | B60L 3/0023 |
| | | | 701/22 |
| 2015/0094890 A1* | 4/2015 | Dasbach | B62M 6/45 |
| | | | 701/22 |
| 2018/0009503 A1* | 1/2018 | Kinpara | B62M 6/55 |

* cited by examiner

METHOD AND DEVICE FOR CONTROLLING A DRIVE UNIT OF A PEDAL-OPERATED VEHICLE

FIELD

The present invention relates to a method and a device for controlling an auxiliary drive unit of a vehicle otherwise powered by the driver with the aid of pedals.

BACKGROUND INFORMATION

For several years, electrical drive units have also been used in mountain bikes (MTB's). In this connection, there are different methods of controlling the drive units, which allow the driver of an eMTB to cope with ascents and hilly and muddy terrain more easily with the aid of the auxiliary drive unit. Thus, there are, for example, special uphill courses, so-called uphill routes, which place demands on the capabilities of the MTB rider in a manner similar to a mountain run (downhill), but may only be managed, using the additional drive unit.

However, in such MTB routes, there are usually route sections or riding situations, in which otherwise normal control of the drive unit via the measured pedaling torque of the rider and/or the pedaling frequency of the pedal crank may only be used to a limited extent in the case of an eMBT. These are, for example, stretches in rocky terrain, where normal operation of the pedals is not possible, since during the rotary motion of the pedals, there is a risk that the pedals strike the rocks or even get caught between the rocks. In order to prevent a fall in these conditions, the pedals are normally kept in a level position by the driver and only briefly manipulated, before they are rotated back again into the starting position. In this connection, the pulses on the pedals generated in this manner produce forward thrust sufficient to move the MTB forwards.

However, such action during the use of an eMTB may produce the result, that the brief pulses on the pedal generate short-term assistance by the drive unit and, therefore, forward thrust, which is immediately eliminated again upon rotating the pedals backwards. This jerky movement due to the additional propulsion of the eMBT by the drive unit during the balancing act may result in falls and reduce the joy of riding. Instead, the rider desires continuous propulsion, which may also be controlled more effectively.

An object of the present invention is to provide a system, which is made up of a device and a method and assists the eMTB in a meaningful manner in such a riding situation.

SUMMARY

The present invention provides a method and a device, including a pedal-operated vehicle. In accordance with an example embodiment of the present invention, the method includes detecting a particular riding situation and consequently operating the auxiliary drive unit situated on the vehicle, longer than in a normal riding situation, without the driver correspondingly detecting the angular motion of the pedals.

In accordance with an example embodiment of the present invention, a vehicle is provided, which may be operated at least partially by the driver, using a pedal drive unit. In this context, in order to control the drive unit additionally present, an angular motion variable, which represents the angular motion of the pedals due to the rider, is measured with the aid of at least one first sensor. In this context, the drive unit situated on the vehicle only allows a forward thrust of the vehicle, e.g., in the form of assistance to the pedal drive unit, when the current angular motion variable exceeds a predefined threshold value. This is intended, for example, to prevent the drive unit from being activated to generate a forward thrust, when the rider is not pedaling or is only pedaling negligibly, that is, generates no or only a slight angular motion of the pedal crank, using the pedals. The same applies to unwanted manipulation of the pedals during a pushing operation, e.g., in a situation, in which the pedals strike an obstruction or the feet. A speed variable of the vehicle, which represents the longitudinal speed, may additionally be measured in order to detect unintentional manipulation of the pedals. Through this, the present invention may be prevented from being used at low speeds.

To implement the method of the example embodiment of the present invention and/or the device of the example embodiment of the present invention, the angular motion variable is measured by the at least one first sensor during a time frame of measurement. A riding situation, in which the rider moves the left and right pedals back and forth substantially about the level position, is detected as a function of this time-resolved angular motion variable. This movement is normally attained in that the rider steps on the pedals briefly without reaching the lower point of the pedal crank, before he/she pulls the corresponding pedals back again. In this connection, it is also possible for the rider to take these steps on only one side and, consequently, to exert these driving pulses, while he/she brings the two pedals level again with a step on the other pedal. If such a situation is detected by the method or a device/a system, the drive unit of the vehicle is controlled in such a manner, that it continues to supply forward thrust for a predefined period of time, even if the normal control would call for a shutdown, e.g., in response to the predefined threshold value not being attained.

Therefore, using an example embodiment of the present invention, it is possible that in a special riding situation, e.g., within the scope of operation of an eMTB, the drive unit allows the propulsion to be assisted, where no assistance is intended according to the control conditions (no propulsion by an auxiliary drive unit without manipulation of the pedals). This allows not only continuous execution of the riding during such a special riding situation, but it also prevents unintentional, short-term instances of assistance by the drive unit, which the driver must additionally compensate for during such a riding situation, in which he/she is concentrating on his/her balance.

For example, a torque sensor or a pedal frequency sensor, which may already be present in current electric bikes, is suitable for measuring the angular motion variables with the aid of the first sensor. In this context, in light of the measured torque applied to the pedals by the driver, it may be discerned if a brief pedal pulse is followed by a resting phase or even a negative torque signal. Alternatively, the pedaling frequency may also be utilized, in order to determine an indication of the corresponding level orientation of the pedals. In addition, it is also possible to measure the position of the pedals directly. To this end, position sensors, which detect at least the level position of the pedals, may be provided. Furthermore, an angular position sensor, which measures the excursion of the pedals, is also possible. From the sensor variables measured in this manner, in particular, from their change with respect to time, inferences as to whether the rider is generating a continuous angular motion about the pedal crank, using the pedals, or is keeping the pedals substantially level, may be made individually or in combination. Thus, a brief pedal pulse in connection with the detection of a pedal not completely rotated about the pedal crank may be an indication of the special riding situation to be detected.

In one further refinement of the present invention, the condition of the surface ridden on and/or the inclination of the surface may additionally be considered for use by the present invention. In this connection, the extent, to which the vehicle travels up a slope or moves on impassable terrain, is measured in order to apply the method of the present invention. Since the described, special riding situation is particularly advantageous in the event of ascents or impassable terrain, the extended control of the drive unit is not undertaken, in particular, during trips on a flat surface or downhill. In order to detect an ascent or impassable and uneven terrain, the vehicle may be equipped with at least one second sensor, by whose sensor variable a roadway variable representing the surface is determined. Consequently, if rough terrain or an ascent is detected in light of the roadway variable, the activation of the drive unit is correspondingly extended in response to detection of the substantially level motion of the pedals. For example, an acceleration sensor, a speed sensor, or an inclination or slope sensor is suitable as a second sensor. In addition, it is also possible to equip a shock absorber present in the vehicle with an appropriate sensor, e.g., a displacement sensor, which measures the vibrations and damping movements in response to passing over the surface. With the aid of the sensor variables measured in this manner, the surface may be deduced in the form of a roadway variable and/or roadway information item.

Optionally, the period of time, in which the drive unit is activated without corresponding, simultaneously occurring manipulation of the pedals by the rider taking place, may be selected as a function of the particular roadway variable or the measured sensor variable of the second sensor. Thus, the period of time for the continued operation of the drive unit may become longer, when the incline is greater, as well, or the terrain is rougher.

In general, the present invention may be used with any vehicle, which may be moved forwards with the aid of pedals, but also by additional motive power. However, the present invention is of particular interest, when it is used in an electric bicycle. In this connection, further potential applications also result, when the present invention is used in an electric bicycle, which is preferably used on terrain, e.g., a mountain bike (MTB) and/or an electrically propelled mountain bike (eMTB). In these cases, the method may utilize the sensors already present in the electric bicycle, in order to detect the special riding situation and to enable the corresponding control of the drive unit.

Further advantages are derived from the following description of exemplary embodiments, and from the figures.

DETAILED DESCRIPTION OF EXAMPLE EMBODIMENTS

As explained above, during rides with a mountain bike, riding situations may occur, in which normal manipulation of the pedals and/or the pedal crank is problematic, since due to this, the pedals may come down on the surface, e.g., on the rocks located there. Thus, in this special riding situation, the rider of the mountain bike tries to go forwards as much as possible with pedals oriented nearly level, and using brief driving kicks without the pedals reaching the lower inversion point. However, in the case of electrical drive units of an electric bicycle, and in particular, in an eMTB, such pedal motion may produce some unwanted, intermittent accelerative forces, which require additional concentration by the driver in order to compensate for them while balancing. Instead, it would be more useful for the drive unit to be operated continuously in response to the detection of such a special riding situation, in order to provide the rider, in this manner, a boundary condition capable of being mastered.

Figure 1:
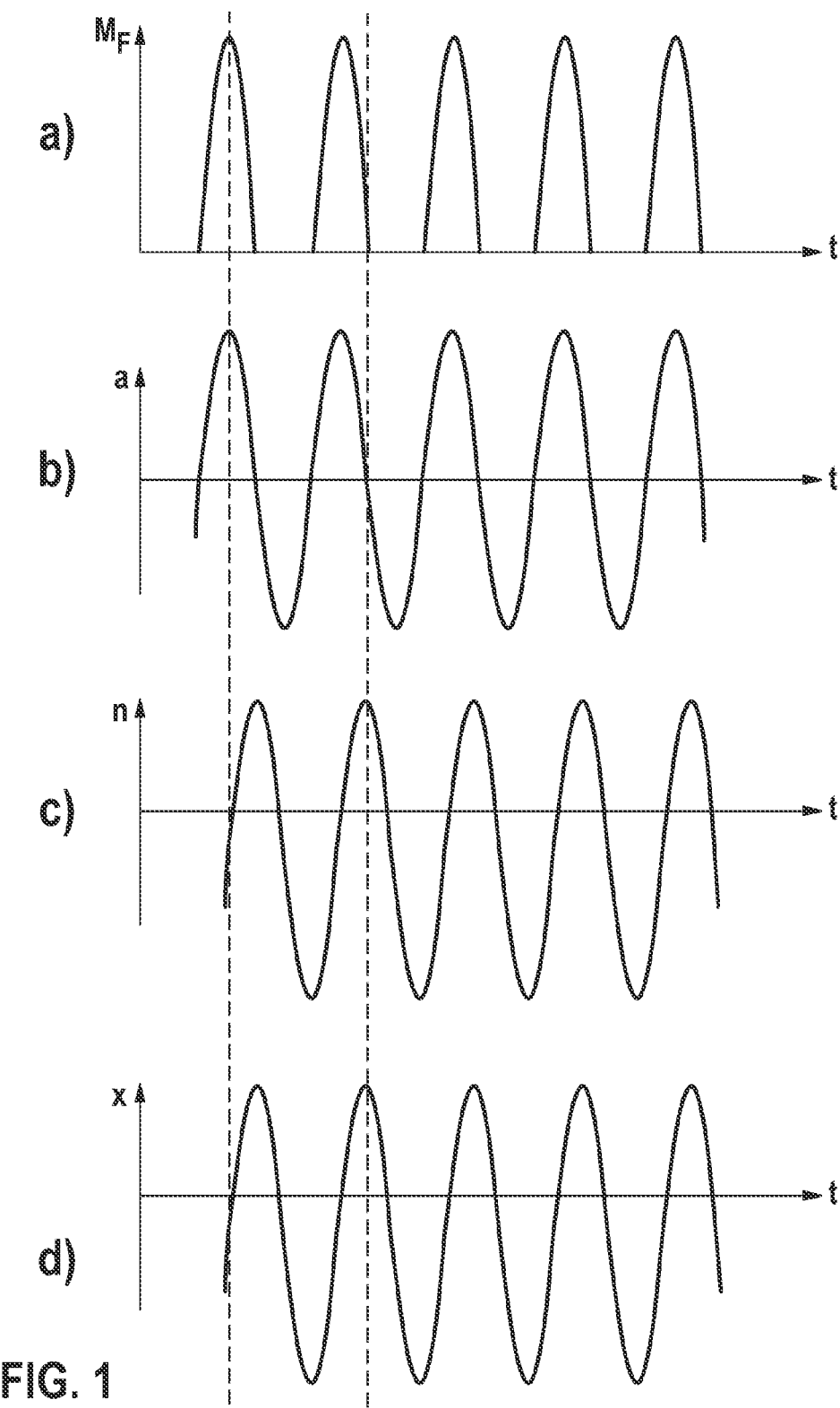
FIGS. 1-3 show graphs via which example embodiments of the present invention are clarified in light of time characteristics of different parameters.

The special riding situation, which results from simultaneous balancing and propulsion in the case of pedals kept substantially level, is initially shown with the aid of graphs a) through d) of FIG. 1. Rider torque $M_F$ during the special riding situation, which is generated due to intermittent and/or pulse-like manipulation of the pedals, is represented in graph a). In this context, normally, only one of the pedals is manipulated intermittently, while the second pedal may be used to bring the first back to the level position again. As an alternative to this, clipless pedals or other attachments of the shoes to the pedals may be used, in order to bring the pedals back to the level position. During the short-term, intermittent manipulation of the pedals, a drive-unit pulse is generated, which results in an acceleration a of the bicycle/eMTB via the chain (see FIG. 1 b)). The acceleration of the bicycle decreases immediately, when the rider no longer pedals. Instead, the bicycle is decelerated.

This special driving situation may also be detected with the aid of pedaling frequency n, as is represented in FIG. 1c. In this connection, at a level pedal position, there is initially no movement of the pedals and, therefore, no pedaling frequency. As soon as the rider pedals, angular motion takes place, which means that a pedaling frequency is derivable even when a complete revolution of the pedals about the pedal crank is not carried out. After the jerky kick is carried out, the pedals are pulled or rotated back, which means that a negative pedaling frequency may be detected. In addition, similar behavior may also be deduced with the aid of a position sensor or an angular position sensor. In this connection, the position or angular change of each of the two pedals may be detected even more accurately, and/or detection of the position or angular change of a single pedal is already sufficient.

Furthermore, travel x of a shock absorber during the special driving situation is represented in the graph of FIG. 1 d). The jerky manipulation of the pedals may also be detected, using this travel x, since the acceleration that the bicycle undergoes on the basis of the pulse-like forward thrust is reflected in compressions and/or expansions of the shock absorber.

Figure 2:
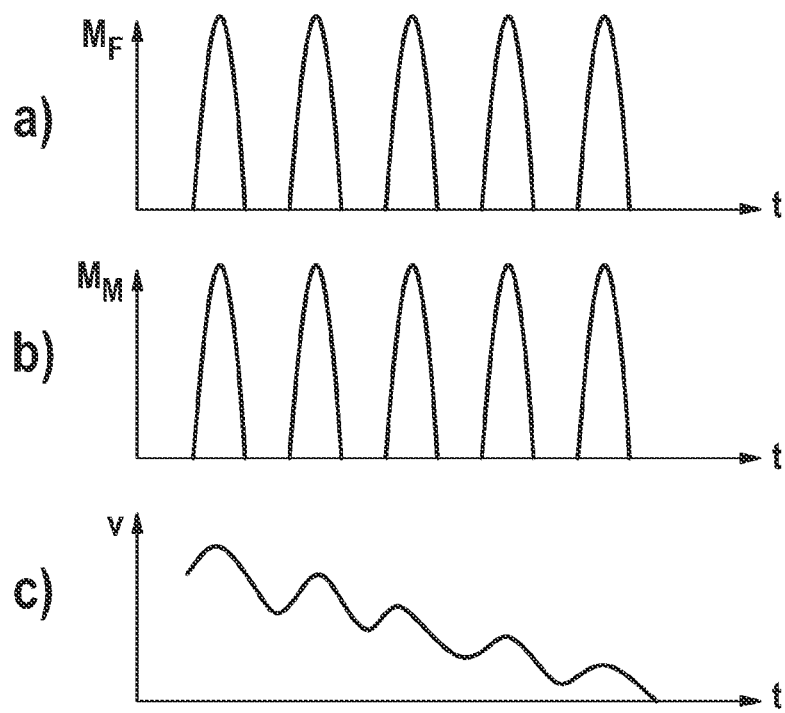

The control of the drive unit, including the generation of drive torque $M_M$ and its effect on speed v of the electric bicycle and/or the eMTB during the above-mentioned, special riding situation, is described in graphs a) through c) of FIG. 2. If the conditions for driving assistance are satisfied, pulse-like instances of support of the drive unit, including the generation of a drive torque $M_M$ shown in FIG. 2 b), are produced due to the jerky pedal manipulation of the driver shown in the graph in FIG. 2 a). A speed v shown in FIG. 2 c) results from the two drive torques $M_F$ and $M_M$ applied in an intermittent and/or pulse-like manner. The resulting speed will decrease in the course of time, since the pedaling pauses and drive torques $M_M$ of the drive unit generated in only a pulse-like manner do not allow constant propulsion.

Figure 3:
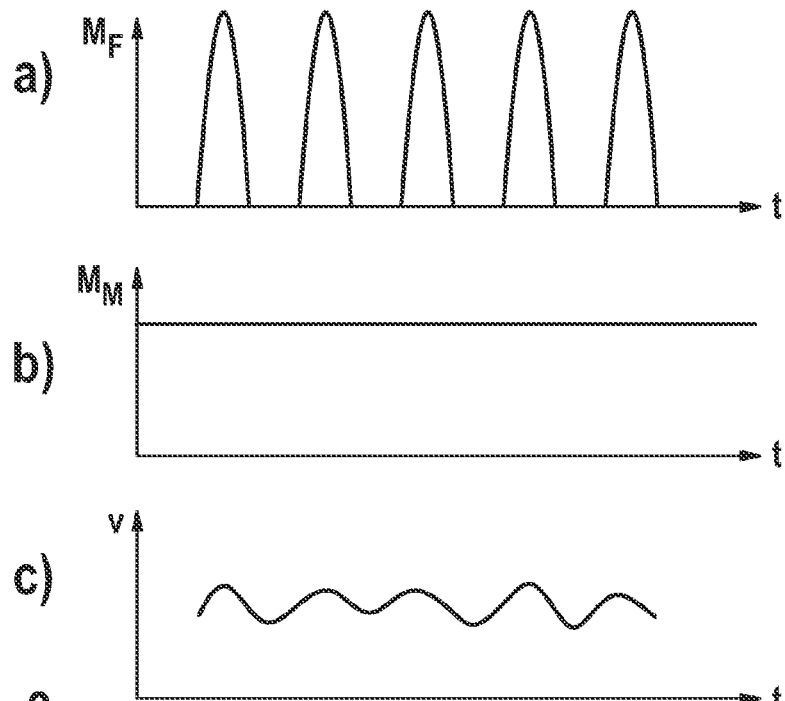

Instead, in response to the detection of the described, special riding situation, the present invention also provides for the drive unit to continue to be operated, when action of the pedals, which is sufficient for switching on the drive unit in the case of otherwise normal operation, is not detected by the corresponding sensors. Such an implementation is described with the aid of graphs a) through c) of FIG. 3. In this connection, starting out from the jerky pedal manipulation of the rider shown in FIG. 3 a), the drive unit continues to be operated for a specifiable period of time. In the example of the graph of FIG. 3 b), this continued operation takes place at a constant drive torque $M_M$ and for a specified period of time, which is selected to be long enough to overlap with the activation of the drive unit by the next intermittent step by the rider. Speed v of the bicycle/eMTB resulting from this may be seen in the graph of FIG. 3 b). To be sure, a changing speed v continues to be detected, but a substantially constant speed is rendered possible by the constant forward thrust via drive torque $M_M$.

The specifiable time of extending the activation of the drive unit, that is, the time of continued operation, may be selected, for example, as a function of the detected surrounding area, e.g., the surface, or as a function of operating dynamics variables. Individual selection on the basis of the riding behavior of the rider is also possible. Measured and stored values of the riding behavior of the rider could be used for this.

Figure 4:
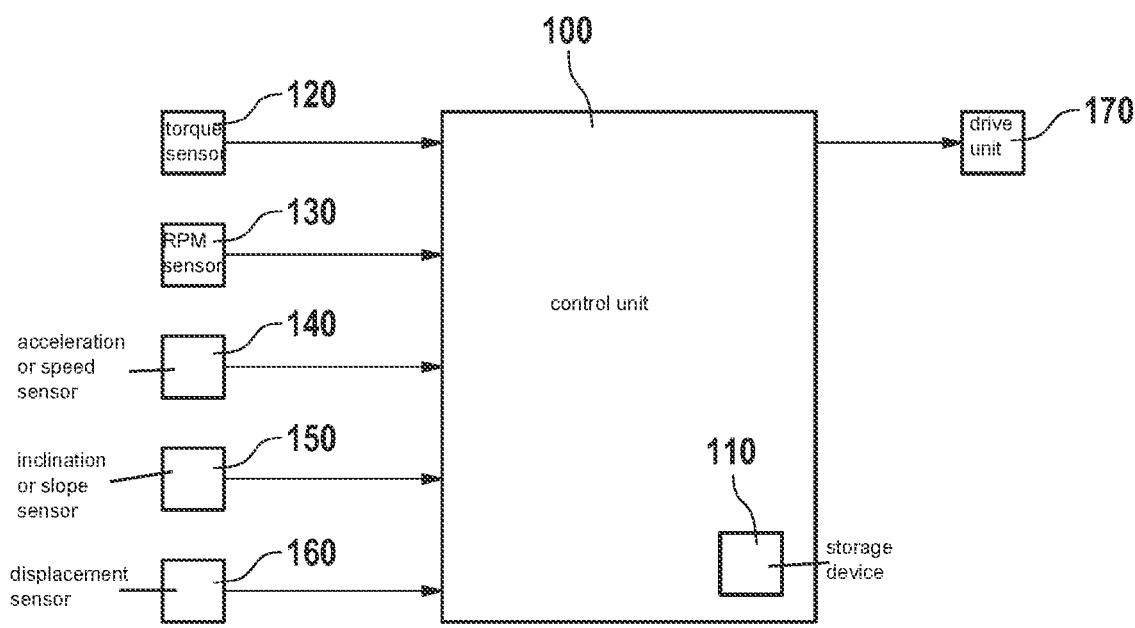
FIG. 4 shows a block diagram of a possible implementation of a device according to the present invention.

An example of a possible implementation of the present invention in a device is shown with the aid of the block diagram of FIG. 4. To this end, a control unit 100 is provided, in which the method of the present invention may be executed. In this instance, this control unit 100 may be provided as a control unit for drive unit 170 of an electric bicycle or an eMTB. However, it may also be provided that in the detected, special riding situations, this control unit 100 only assume the control of drive unit 170 independently of the control unit of the drive unit.

Control unit 100 may include a storage device 110, in which the measured sensor variables, as well as threshold values, comparison values or individual rider data, are stored. In order to detect the special riding situation, control unit 100 acquires the sensor variables of at least one first sensor. This first sensor may be, for example, a torque sensor 120, which measures the torque of the rider on the pedal crank. Alternatively, or in addition, an RPM sensor 130, which measures the rotational speed or the pedaling frequency, may be provided. In addition, it is possible for control unit 100 to measure the acceleration and/or speed with the aid of an acceleration or speed sensor 140. For further variants of the present invention, control unit 100 may acquire the sensor variables of an inclination or slope sensor 150, as well as travel x of a shock absorber with the aid of a displacement sensor 160.

Optionally, or in addition, control unit 100 may acquire the sensor variables of a force sensor on at least one of the pedals, a position sensor on the pedal crank, or an angular position sensor, in order to determine the setting and/or position of at least one pedal.

Figure 5:
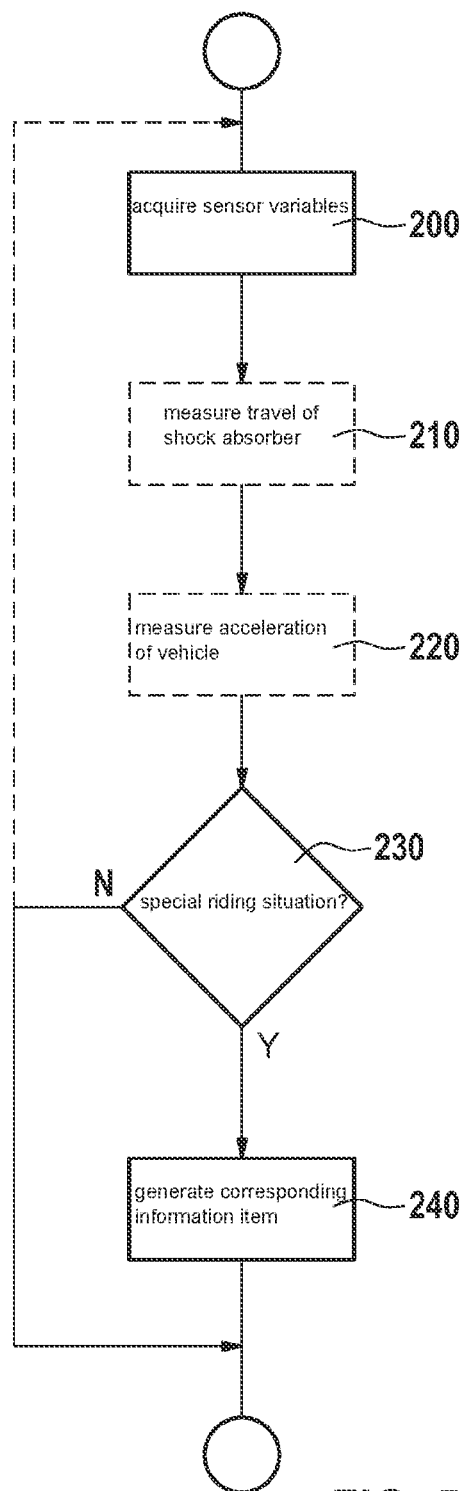
FIG. 5 shows a flow chart which shows the detection of a special situation during the manipulation of the pedals by the rider of the vehicle, in accordance with an example embodiment of the present invention.

The flow chart of FIG. 5 shows a possible method, by which the described riding situation may be detected. To this end, in a first step 200, sensor variables, which represent the movement of the pedals by the rider, are acquired. Since the special riding situation is a short-term motion, it is necessary for the sensor variables to be measured during a certain time frame of measurement. Then, as a function of the sensor variables measured in this manner during the time frame of measurement, it may be discerned, in a subsequent step 230, if the special riding situation is present. In this case, in a subsequent step 240, a corresponding information item is generated, which is available for the further method. However, if it is discerned, in step 230, that the special riding situation is not present, the method according to FIG. 5 may be ended or run through again at step 200.

In an optional exemplary embodiment, prior to step 230, the travel of a shock absorber and/or the acceleration of the vehicle, that is, the electric bicycle, may be measured in a step 210 and/or in a step 220, respectively.

In order to detect the special riding situation, each sensor variable, which characterizes the movement of the pedals by the rider, may be acquired in first step 200. Thus, the pedaling torque of the rider may be measured as accurately as the pedaling frequency. In addition, it is also possible to measure the position or setting of the pedals directly or to detect the motion with the aid of an angular position sensor. In this context, in step 230, the special riding situation may be detected with the aid of a single time-resolved sensor variable or by viewing at least two time-resolved sensor variables as a whole. Thus, for example, the chronological sequence of the pedaling torque of the driver, in conjunction with the pedaling frequency, may be used as an indication of the special riding situation. However, it is also possible to deduce the special riding situation on the basis of a sign change of the underlying sensor variable, for example, using a negative pedaling frequency or a positive/negative movement of the shock absorbers. Furthermore, other sensor variables, which are mentioned above, may be used for detection.

Figure 6:
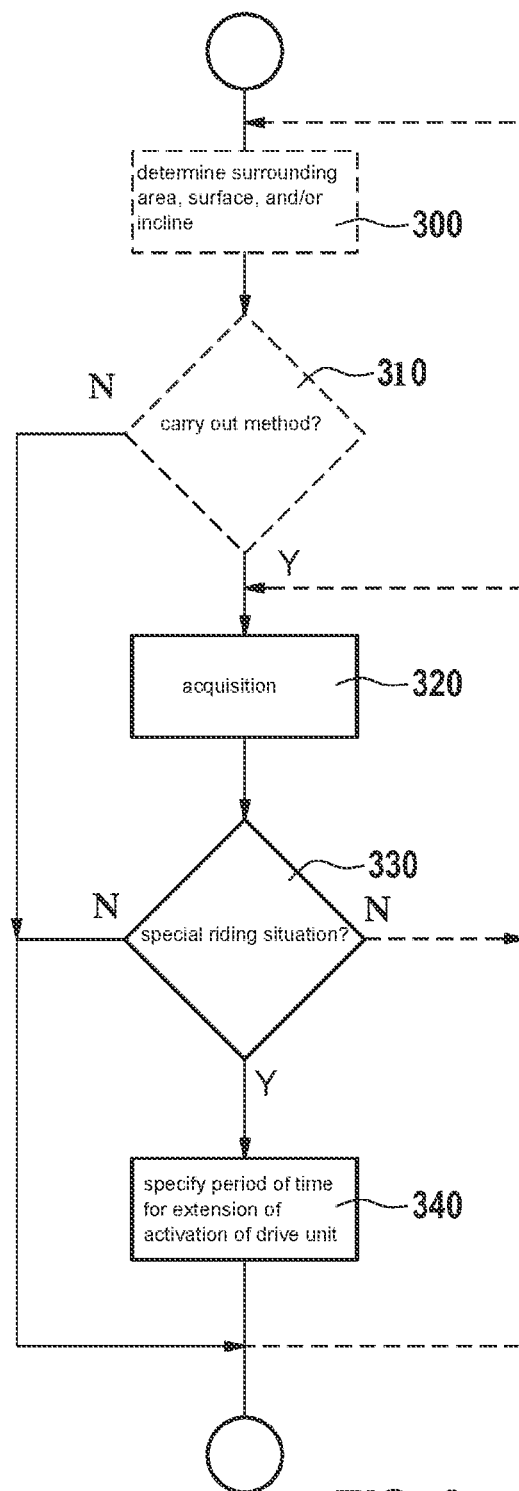
FIG. 6 shows a flow chart of an example method, which controls the activation of the drive unit of the vehicle as a function of the detected special situation.

The flow chart of FIG. 6 describes a method, which, starting from the detected, special riding situation, allows the activation of the drive unit to be extended. In this connection, the method may be started deliberately in response to detection of the special riding situation (see the method according to FIG. 5). Alternatively, the acquisition of the necessary sensor variables may be carried out in a step 320, and the identification as such may be carried out in a step 330. If it is discerned, in step 330, that the special riding situation is not present, the method may be ended or restarted. In response to detection of the special riding situation in step 330, or upon initiation of the method in accordance with the presence of the information item regarding the special riding situation, the control and, consequently, the extended generation of forward thrust, may be carried out in a subsequent step 340. At this point, the method may also be ended with that or run through again with the acquisition of the sensor variables necessary for detecting the special riding situation.

In a step 300 prior to step 340, the surrounding area, the terrain, the surface, and/or the incline, on which the electric bicycle is moving, may optionally be determined. To this end, inclination sensor variables, as well as acceleration sensor variables or travel strokes of shock absorbers, may be measured with the aid of a suitable sensor. In subsequent step 310, it is checked if the method of the present invention is intended to be carried out in the context of a surrounding area, a terrain, a surface, and/or an incline. If this is not the case, then the method is ended. Thus, it may be provided that the method of the present invention not be intended to be used during a ride on a level surface or downhill. Otherwise, the acquisition and detection of the special riding situation, e.g., steps 320 and 330, may be continued.

In a further exemplary embodiment, it may also be provided that the period of time, during which the activation of the drive unit is extended in step 340, be specified as a function of the measured incline, the detected surface, and/or the measured roughness. As an option, the period of time may be specified as a function of a stored riding behavior of the rider.

In addition, the drive unit may be controlled as a function of the detected incline and/or the identified surface and/or the measured roughness in such a manner, that a specified bicycle acceleration is set or not exceeded. In this connection, for example, in the case of an identified gravel path, the acceleration by the drive unit, that is, the acceleration, which the entire bicycle undergoes due to the drive unit, may be limited to a specified gravel acceleration value. In a further example, in the case of a detected incline, a deliberate and, therefore, specified acceleration, as well, may be set, so that a minimum speed is reached on a hill. In the opposite case, a low magnitude of acceleration may be specified in the case of a downhill run.

What is claimed is:

1. A method for controlling a drive unit of a pedal-operated vehicle having pedals, the method comprising the following steps:
    measuring, using at least one first sensor, an angular motion variable, which represents an angular motion of the pedals due to a rider; and
    controlling the drive unit of the vehicle to generate a forward thrust when the angular motion variable exceeds a specified threshold value;
    wherein the method further comprises:
        measuring, using the at least one first sensor a time-resolved angular motion variable, which represents the angular motion of the pedals due to the rider during a time frame of measurement; and
        detecting, as a function of the time-resolved angular motion variable, a riding situation, in which the pedals are moved back and forth substantially about a level position; and
        continuing to control the drive unit as a function of the detected riding situation to generate the forward thrust for a specifiable period of time when the angular motion variable reaches or falls below the specified threshold value.

2. The method as recited in claim 1, wherein the pedal-operated vehicle is an electric bicycle.

3. The method as recited in claim 1, further comprising:
    measuring a torque of the rider on the pedals as a time-resolved rider torque, using a torque sensor and/or measuring a pedaling frequency of the rider using an RPM sensor; and
    detecting the riding situation as a function of the time-resolved rider torque and/or a time-resolved pedaling frequency.

4. The method as recited in claim 1, further comprising:
    determining, using measured sensor variables of at least one second sensor, a roadway variable that represents a surface on which the vehicle moves; and
    detecting the riding situation when the roadway variable indicates travel on a rough terrain and/or an incline;
    wherein the roadway variable is generated using an acquired acceleration signal, or a speed signal, or an incline signal, or a displacement signal.

5. The method as recited in claim 4, wherein the period of time, in which the drive unit continues to be controlled and/or operated, is specified as a function of the determined roadway variable, and/or a measured incline and/or a measured acceleration.

6. A device for controlling a drive unit of a pedal-operated vehicle having pedals, the device comprising:
    a control unit configured to:
        measure, using at least one first sensor, an angular motion variable, which represents an angular motion of the pedals due to the rider; and
        controlling the drive unit of the vehicle to generate a forward thrust when the angular motion variable exceeds a specified threshold value;
    wherein the control unit is further configured to:
        measure, using the at least one first sensor, a time-resolved angular motion variable, which represents the angular motion of the pedals due to the rider during a time frame of measurement;
        detect, as a function of the time-resolved angular motion variable, a riding situation in which the pedals are moved back and forth substantially about a level position; and
        continue to control the drive unit as a function of the detected riding situation to generate the forward thrust for a specifiable period of time when the angular motion variable reaches or falls below the specified threshold value.

7. The device as recited in claim 6, wherein the pedal-operated vehicle is an electric bicycle.

8. The device as recited in claim 6, wherein the control unit is configured to:
    measure a torque of the rider on the pedals as a time-resolved rider torque using a torque sensor, and/or measure a pedaling frequency of the rider using an RPM sensor; and
    detect the riding situation as a function of the time-resolved rider torque and/or a time-resolved pedaling frequency.

9. The device as recited in claim 6, wherein the control unit is configured to:
    determine, using sensor variables of at least one second sensor, a roadway variable that represents a surface on which the vehicle moves; and
    detect the riding situation when the roadway variable indicates travel on a rough terrain and/or an incline;
    wherein the second sensor including an acceleration sensor or a speed sensor or an inclination sensor or a displacement sensor, configured to measure a resilience of a shock absorber on the vehicle.

10. A pedal-operated vehicle, comprising:
    a drive unit;
    a device including a control unit configured to:
        measure, using at least one first sensor, an angular motion variable, which represents an angular motion of the pedals due to the rider; and
        controlling the drive unit of the vehicle to generate a forward thrust when the angular motion variable exceeds a specified threshold value;
    wherein the control unit is further configured to:
        measure, using the at least one first sensor, a time-resolved angular motion variable, which represents the angular motion of the pedals due to the rider during a time frame of measurement;

detect, as a function of the time-resolved angular motion variable, a riding situation in which the pedals are moved back and forth substantially about a level position; and continue to control the drive unit as a function of the detected riding situation to generate the forward thrust for a specifiable period of time when the angular motion variable reaches or falls below the specified threshold value.

11. The vehicle as recited in claim 10, wherein the vehicle is an electric bicycle.

* * * * *